March 12, 1968  U. J. SCHMIDT ET AL  3,372,972
OPTICAL BEAM DEFLECTOR
Filed July 30, 1962
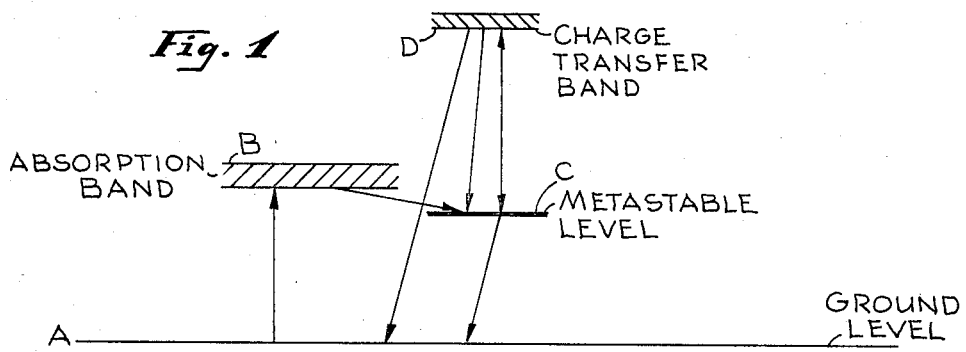
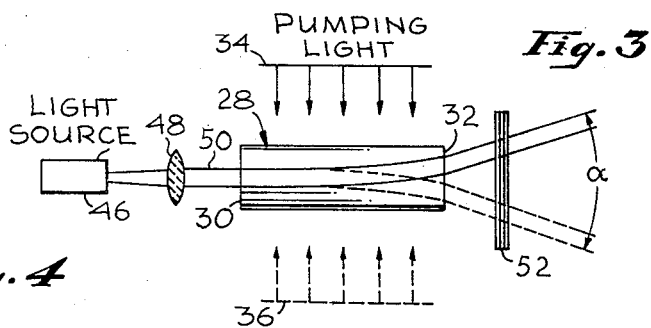
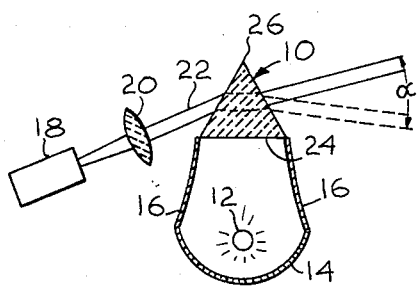
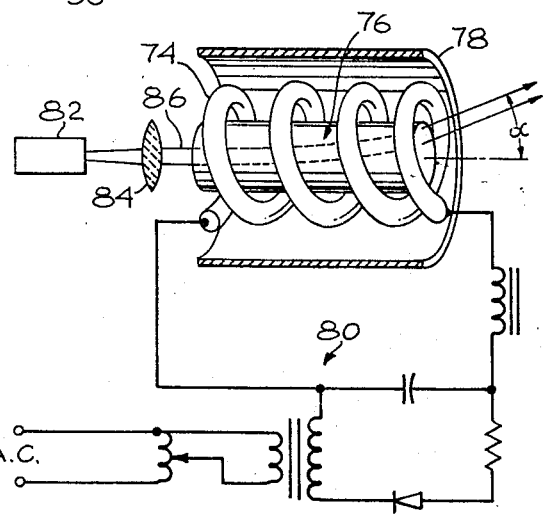
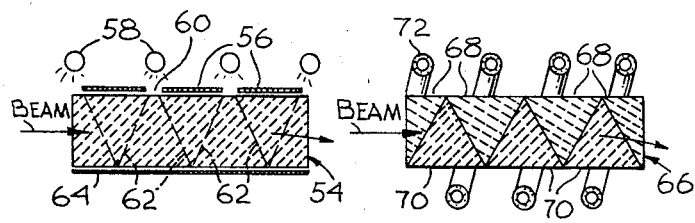
UWE J. SCHMIDT
FRITHJOF N. MASTRUP
INVENTORS
BY Robert O. Richardson
ATTORNEY United States Patent Office 3,372,972
Patented Mar. 12, 1968

3,372,972
OPTICAL BEAM DEFLECTOR
Uwe J. Schmidt, Canoga Park, Calif., and Frithjof N. Mastrup, Simi, Calif., assignors to TRW, Inc., a corporation of Ohio
Filed July 30, 1962, Ser. No. 213,235
3 Claims. (Cl. 350—160)

The present invention relates generally to systems and apparatus for electro-optically deflecting selected electromagnetic radiation energy and finds particular utility in connection with radiation energy in the visible and near visible regions of the electromagnetic spectrum.

There are a great many instances where deflection of a beam of light is not only useful but in some cases is absolutely necessary for accomplishment of particular results. The art is replete with optical systems employing mirrors, prisms, lenses and the like for directing beams of light energy in desired directions and for moving such beams of light energy in an angular manner. Such systems have employed scattered, collimated, polarized and filtered light at both multiple- and mono-frequencies. It has been a relatively simple matter to provide means for moving or oscillating a mirror, for example, in order that a light beam may be made to sweep linearly through a particular angle. Also, it has been extremely common to employ optical systems to establish beams of light that are relatively highly collimated. Structures of this type have long been known and may be found, for example, in the multitude of contemporary projection systems, viewing and display systems, photographic apparatus, telescopic devices, illumination systems, and scientific structures. All of these prior art systems capable of deflecting a beam of electromagnetic energy in the visible or near visible spectrum are characterized by the use of mechanical structures or optical systems that are physically moved from one position to another. Even though such physical movement can comprise extremely high frequency oscillatory motion, inertial, frictional and similar factors impose serious limitations upon the rate of light beam deflection.

Controlled deflection of relatively low frequency electromagnetic radiation energy in the microwave region has long been accomplished without the use of mechanically moving parts. For example, a beam of microwave energy may be made to scan through an angle through use of an array of waveguides having suitably positioned slots therein. By changing the phase relationship of the energy relative to a plurality of such slots, the scan is accomplished. Structures of this type are commonly employed in radar antennas and avoid problems normally associated with physical movement of an antenna. While this scanning of a microwave energy beam may thus be accomplished at electronic speeds, such techniques may not be used with electromagnetic radiation in the visible or near visible regions of the electromagnetic spectrum, inasmuch as phase changes may not be readily accomplished in these regions utilizing contemporary technology.

Optical beam deflection at high switching or scanning rates has numerous applications, such as in the reading and writing of characters and symbols in their many forms of technical applications, reading and writing in memories, ultra-high frequency modulation of light and in optical or electronic switching. The time necessary to switch the beam from one position to another, in these applications, should not exceed the microsecond range, and the switching rate should be on the order of $10^6$ changes per second. Whereas prior art devices mechanically deflected a beam by varying its angle of incidence relative to a medium having a fixed refractive index, the present invention teaches that controlled beam deflection at these higher frequencies can be accomplished by selectively varying the refractive index of a medium through which a beam is passed at a fixed angle of incidence.

In one embodiment of the invention, the refractive index of a medium is selectively varied by changing the state of the molecular structure of which the material is composed. In principle, any change of state of an atom changes its interaction with electromagnetic waves of certain frequencies. When this happens to a large number of atoms in a macroscopic piece of material, the refractive index of this material is changed.

The change of state of atoms may be accomplished, in one form of the present invention, by raising the energy level of certain materials to a higher energy level by "optical pumping," a process of changing the state of an atom through transfer of energy corresponding to optical frequencies. Optical pumping may be done by raising electrons from their ground or low energy level state by energy transfer from other atoms, by collision with free electrons in a discharge, by electron impact, or by absorption of light and transfer into another state. In one form of optical pumping, a change in energy level of an atom is caused by the atom absorbing a photon. This is done by irradiating a material with light photons of a particular wave length so that they will be absorbed by certain atoms of the material. When light photons are emitted by the atoms, the atoms gain or lose the energy of the photons, thus changing their physical state. The photons of light, with their comparatively high quantum of electromagnetic energy, when absorbed by an atom, produce a transition of an electron from one orbit of the atom to another. This transition changes the atom from its low energy level or "ground" state to a higher energy level or "excited" state. Thereafter, this higher energy level or excited state causes stimulated radiation of photons, the energy level in the atom then reverting to the ground or low energy level state or to some state inbetween.

Optical pumping has been employed in a device known as a laser (light amplification by stimulated emission of radiation) for light amplification purposes. Applications of laser devices have been found, for example, in communication in space, on earth and under the sea, as well as in surveillance and weapon systems, mapping, medical and computer technology. Additionally, spectroscopic research, deep space navigation and other applications are currently under investigation. These investigations have established facts relating to the stimulation of the atoms in certain substances to excite such atoms to the desired higher energy levels. It has been found that certain so-called fluorescent materials may be readily excited to higher energy levels by optical pumping by both pulse and continuous bombardment by radiation at a particular frequency. Materials that will exhibit such characteristics are found in both gaseous and solid states, as, for example, a helium-neon mixture or a ruby. The basic requirement for operation of devices employing the principles associated with the raising of the energy level of materials is an active material that will produce stimulated emission of radiation when bombarded by an excitation source that pumps power into the active material. Both the solid state and gaseous types of structures that are known to exist have these characteristics.

Whereas optical pumping has been used in laser devices for the purpose of light amplification, in the practice of the present invention optical pumping is used to vary the refractive index of a medium to thereby deflect a light beam passing therethrough.

In accordance with the present invention, when the energy level of a sufficient number of atoms is raised, such as by optical pumping, the effective index of refraction of the material composed of the atoms will change. Since the population of atoms in the excited state, or high energy level, is related to the intensity of the optical pumping, when other factors controlling the change in energy levels are unchanged, the effective index of refraction of the material can be changed to that desired simply by controlling the intensity of the optical pumping. In this manner, optical pumping to raise the energy level of the material will result in a change in deflection of a beam of light passing obliquely through the material.

An additional feature of the invention permits a light beam striking a medium perpendicularly to be deflected by causing the population density of atoms at the high energy level to be varied over the cross-section of the material, with corresponding variations in the effective refractive index of the material. In this manner, a beam intercepting the material from a direction normal, as well as oblique, to the plane of the intercepted surface of the material may be selectively deflected from its original path.

In accordance with another aspect of the present invention, means are provided for effecting a change in the population density variation of excited atoms in a material in such a manner that the population density varies in a direction that is substantially normal to the axis of a light beam directed through the material. Such a variation in population density of excited atoms is accomplished, in accordance with one aspect of the invention, by establishing locations in the cross-section of the material for the atoms that may react to optical pumping, as well as means for varying the optical pumping effectiveness through the material.

Other and further important details of the present invention will become apparent from the disclosures in the following detailed specification, appended claims, and accompanying drawings wherein:

FIGURE 1 is a diagrammatic representation of the various energy levels that are involved in the present system in the particular material and passage of a light beam therethrough;

FIG. 2 is a diagrammatic representation of one form of structure which may be used to carry out the present invention;

FIG. 3 diagrammatically illustrates another form with an alternate optical pumping arrangement;

FIG. 4 is a partially sectional view of the embodiment of FIG. 3;

FIG. 5 is a diagrammatic sectional view representing an alternate form of obtaining a transverse variation in energy population level in a material being subjected to optical pumping;

FIG. 6 is a diagrammatic view showing an alternate form of material subjected to optical pumping; and FIG. 7 illustrates another form of the present invention together with an alternate form of pumping energy source and a suitable circuit for operation thereof.

With reference to the drawing, and with reference primarily to the energy level chart illustrated in FIG. 1, as a further explanation of the manner in which the energy level of particular materials is raised by optical pumping, let it be assumed that the particular fluorescent material that will be considered in this invention by way of example is ruby. Ruby is composed of aluminum oxide in which a few of the aluminum atoms have been replaced by chromium atoms, and particularly, as the number of chromium atoms increases, the apparent color of the ruby becomes deeper. The active atoms in ruby are the chromium ions, with a concentration of some $10^{18}$ ions per cubic centimeter (0.05%) for the common "pink" ruby which is used for purposes of the present explanation. When such a ruby material is subjected to optical pumping by external light at a wavelength of, say, 5500 Angstrom units, the energy level of the chromium atoms will be raised by absorption of the pumping light. With reference of FIG. 1, a ground level of energy is represented by the line A, and, upon optical pumping of the ruby in the present example, the energy absorbed by the chromium atoms raises the energy level thereof to an absorption band level that is indicated at B, and the chromium atoms may be considered as being in their high energy level or excited state. This excited state of the chromium atoms will remain for a finite period and thereafter a portion of the energy contained therein will be given up to the crystal lattice of the ruby, whereupon the energy level of the excited chromium atoms will fall back to an intermediate metastable level indicated at C. If excited chromium atoms in the metastable level C are not subjected to additional excitation, they will remain at this level for a few milliseconds while they drop at random to the ground level A. Photons emitted during this drop have a particular wavelength which accounts for a characteristic red fluorescence of ruby crystals when stimulated by the external source. Upon continued optical pumping, the metastable level C may now be considered as a second ground level from which the energy level of the chromium atoms may be raised to a still higher level indicated at D and defined as a charge transfer band. From the charge transfer band, the excited chromium atoms return both to the metastable level C and the ground level A if no further or continued excitation is carried out.

It is known that the refractive indexes of materials are determined by the atomic, molecular, and intermolecular forces therein. When such forces are altered in a fluorescent material, as by optical pumping, the refractive indexes thereof will also be altered, thus providing a basis for the present invention. However, a fluorescent material in a ground energy level state and a fluorescent material in a highly excited state will have but two refractive indexes, this invention further serving to provide a variable refractive index in order that a beam of light at a particular frequency may be deflected through a suitable angle or made to provide a continuous linear or area scan through this particular angle or over a prescribed area. Such results will be obtained upon varying the level of excited atoms in a direction substantially transverse to a beam of light to be deflected. The present invention provides means by which this may be carried out.

In FIG. 2, one form of the invention is shown which utilizes a bar of fluorescent material, indicated generally at 10, that is of a generally prismatic cross-sectional configuration. Pumping light for the material 10 is provided by a light source 12 that is associated with a reflector 14, having suitable side plates 16, whereby to reflect, concentrate, and direct as much of the pumping light 12 as possible toward and into the material 10. A light source 18 is also provided, light therefrom being directed through a collimating lens 20 to provide a collimated beam 22 which is directed laterally through the prismatic material 10. It is to be noted that the amount of material adjacent the pumping light source is substantially greater than that remote from the pumping light source in the prismatic material 10. Accordingly, the population density of excited atoms will be substantially greater adjacent the base 24 of the prism than at the apex 26 thereof. Accordingly, the light beam 22 passing through the prismatic material 10 will be subjected to deflection in a manner similar to that described in connection with the form of the invention shown in FIG. 3, inasmuch as the population density of excited atoms in a direction substantially normal to the axis of the beam 22 is varied. Accordingly, the beam 22 may be deflected through an angle α as indicated in FIG. 2.

With reference to FIGS. 3 and 4, wherein the present beam deflecting structure is diagrammatically illustrated, a suitable fluorescent material is indicated generally at 28, and, as indicated hereinbefore, this material may be considered as ruby or any other suitable material having fluorescent characteristics. In other words, any material, either solid or gaseous, may be employed for present purposes in which there is a suitable quantity of atoms that are capable of absorbing photons when pumped by light from an external source.

As shown diagrammatically, the material 28 has planar ends 30 and 32 and may be an elongated, generally cylindrical rod that is circular in cross-section. However, the cross-sectional configuration of the material is relatively unimportant to the practice of the present invention. The ends 30 and 32 are preferably highly parallel and optically polished. In order to provide a variable density of excited atoms laterally across the material 28, means are provided for delivering pumping light thereto from at least two sources indicated at 34 and 36, respectively. As shown in FIG. 4, the sources 34 and 36 may comprise elongated, tubular light sources 38 and 40, together with suitable reflectors 42 and 44, in order to gather and concentrate as much pumping light as possible on one lateral side or the other of the material 28. Inasmuch as there is light absorption as the light passes laterally through the material 28, a higher concentration of excited atoms will be present in the material most closely adjacent the pumping light. The pumping light may also be varied in intensity and direction by alternately energizing one or the other of the light sources 38 and 40, whereby not only to vary the level of optical pumping, but also to alter the population level of excited atoms within the material. The light sources 38 and 40 may be any suitable source of high intensity light and may take the form of a xenon flash tube or the like which may produce light of a wide spectrum. Preferably, the pumping light for ruby material may be in the order of 5500 A., and, of course, light at this frequency is available as a portion of the output of a xenon type flash tube. Other types of pumping light sources, such as mercury vapor arcs or the like, may be employed to provide continuous excitation of the material 28, as desired.

With further reference to FIG. 3, a source of light for the beam to be deflected is indicated at 46. This source may also be from flash-type tubes or continuously operating high intensity sources and is directed through a suitable collimating lens 48 to provide a highly collimated light beam 50 that is directed longitudinally through the material 28, entering through the planar end 30 and leaving through the planar end 32.

In order to prevent light from source 34 from mixing with the beam 50, multiple layer interference filters 52 may be disposed in the path of the beam 50. These interference filters 52 filter out light having frequencies other than the narrow band frequency of the light beam 50. If the light source 34 contains frequencies within the narrow band frequency of the light beam 50, and this light is escaping through the filters 52, an additional filter may be placed between the light source 34 and the material 28, this filter being such as to filter out the undesired narrow band frequency.

Inasmuch as the refractive index of the material depends upon the atomic, molecular and intermolecular structure of the material, and inasmuch as means have now been defined for changing such structure through excitation of atoms within the material and means have been described for varying the excitation in a direction substantially normal to the axis of a beam of light passing therethrough, this beam of light will thus be deflected through an angle α as indicated in FIG. 3, with the amount of deflection being related to the change in the refractive index of the material through which the beam passes. By varying the level of the optical pumping, the beam 50 may be positioned at any position within the angle α or may be swept from one extreme to the other of this angle, as desired. This phenomenon may be more thoroughly understood if one considers the excited material as having the varied population density of excited atoms across the material and normal or transverse to the axis of the beam to be deflected, as being similar to a prism. However, such structures differ physically from a prism inasmuch as the deflection of the beam as it passes longitudinally through the material is continuous to produce a physical curving to the beam rather than the dual refraction thereof as when directed through a prism. The light beam will be deflected in a direction toward the lateral side of the material having the highest population density of excited atoms.

FIGS. 5 and 6 disclose different methods for creating a variable population density of excited atoms in a direction substantially normal to a beam of light to be deflected. In FIG. 5, an elongated bar of fluorescent material 54, which may be of any cross-sectional configuration, is provided with a plurality of masks 56 adjacent one lateral side thereof. In this instance, pumping light from a suitable source, or multiple source as indicated at 58, is directed through openings 60 in or between the masks 56, the light being admitted to the material 54 through the openings 60 following a pattern generally indicated by the lines 62. Unlike the embodiment in FIGS. 3 and 4, a greater total number of ions will be excited adjacent the lateral side of the material 54 remote from the light source 58 and mask 56 than in the lateral side of the material immediately adjacent the light source and mask. This is most readily accomplished when the light intensity is sufficiently high, the light absorption is sufficiently low, and the angle of light dispersion through the masks is sufficiently great that the total number of excited atoms is greater on that side. When a sufficient pumping light intensity is available so as to make the density of excited atoms constant throughout the illuminated area of the material, then, because a greater cross-sectional area is illuminated on the side remote from the openings, a greater total number of ions are excited on the remote side than on the adjacent side. The material 54 functions in a manner similar to that described hereinbefore to enable variable deflection of a light beam, depending upon the intensity and duration of the pumping applied thereto. If desired, the lateral side of the material 54 remote from the mask 56 may be provided with an opaque shield 64 which may also be internally silvered to increase the level of pumping within the material 54.

With reference to FIG. 6, a still further means for providing the variable population density of excited atoms in a bar of material is illustrated. In this form of the invention, a bar of material 66 is constructed from prismatic sections which may alternately be ruby and sapphire. For example, the sections 68 may be sapphire and the sections 70 may be ruby, and, inasmuch as only the ruby sections 70 contain chromium atoms, only these chromium atoms will be excited, and the triangular configuration of the ruby material provides the desired transverse variable population density of excitation in the bar of material 66. Inasmuch as the refractive index of both ruby and sapphire is substantially the same, the light beam directed through the material 66 would not be appreciably affected by passage through the different materials. In the form of the invention shown in FIG. 6, a light source 72 is provided which may be similar to the light source 74 in the form of the invention shown in FIG. 7. The light source 72 may completely surround the material 66, as shown, inasmuch as the variable transverse population density of the excited atoms is obtained by the generally triangular configuration of the ruby sections 70. A suitable reflector may also be provided about the light source 72 and may be of the type illustrated in FIG. 7.

Still another form of the invention is shown in FIG. 7, wherein a generally cylindrical bar of fluorescent material is indicated at 76. The bar of material 76 is similar to the material 28 as described in connection with the form of the invention shown in FIG. 3, with the exception that the material is initially provided with a variable density of the particular atoms which may be excited laterally across the material 76. For example, sapphire may be doped with chromium in a variable manner and in a direction lateral to the axis of the material 76 whereby a higher density of chromium atoms will thus be present adjacent one lateral side thereof, with this density being varied across the material to a level of substantially zero at the opposite lateral side of the material. Accordingly, in this form of the invention, the material 76 may be surrounded with a light source, as, for example, a helically formed xenon flash tube 74, which is in turn enclosed within a generally cylindrical reflector 78. The flash tube 74 is connected to a suitable power source and triggering circuit, indicated generally at 80. As in the previously described forms of the invention, the form of the invention shown in FIG. 7 is provided with a light source 82, light therefrom being directed through a collimating lens 84 to provide a collimated beam of light 86. Accordingly, upon energization of the light source 74 to pump energy into the material 76, the light beam 86 will be deflected selectively through the angle $\alpha$ inasmuch as the population density of the excited atoms will vary in a direction substantially transverse to the axis of the beam 86, such density being established by the described varying density of excitable atoms as predisposed in the material 76. In this form of the invention, it is apparent that the angle $\alpha$ has one extreme lying on the original axis of the light beam 86 and that deflection of the light beam is in one direction only relative to this axis. As in the case of the form of the invention shown in FIG. 3, the deflected light beam emitted from the form of the invention shown in FIG. 7 may also be directed through suitable multiple layer interference filters, if desired.

It may thus be seen that several means have been provided for deflecting an energy-containing beam operating in the visible or near-visible region of the electromagnetic spectrum and for deflecting such beam at electronic speeds through a suitable angle and controllable, as desired. Through use of pumping light directed toward and into the fluorescent material or through use of varying configurations of fluorescent material, it is apparent that a light beam may be deflected in a manner to scan an area. The population density of the excited atoms may thus be selected at random relative to any radial direction from an axis of the fluorescent material whereby to deflect the light beam in a manner to provide an area scan.

With the present capability for deflecting a beam of visible light both linearly and over an area, it may be seen that typical applications for the system hereof reside in such structures as television and other types of projection systems wherein a rapid change in the location of a projected image is necessary. Additionally, the apparatus and system hereof may be used for the switching of electro-optical elements in various types of control systems and for sweeping a beam of light in optical radar devices to provide either a linear or area scan. Still further, through use of a point source of light and a beam having extremely small cross-sectional area, the present device is useful in memory or storage systems which make use of photographic, photochromatic, or other types of materials whose state is capable of being altered by light.

Having thus described the invention and several embodiments thereof, it is desired to emphasize the fact that many further modifications may be resorted to in a manner limited only by a just interpretation of the following claims.

What is claimed is:
1. An optical energy beam deflector comprising:
   a light energy source;
   means for transmitting a light beam from said source along a path;
   a material positioned in said path having a first index of refraction whereby the light beam passes through the material and leaves in a given direction, said material having chromium atoms therein; and
   means for varying the index of refraction of said material in a direction transverse to said beam path, said last mentioned means exciting more chromium atoms in said material on one side of the beam than on the other side,
   thereby varying the population density of energy levels transverse to the beam path and laterally across said material effectively changing said given direction.

2. An optical energy beam deflector comprising:
   a light energy source;
   means for transmitting a light beam from said source along a path;
   a material positioned in said path having a first index of refraction whereby the light beam passes through the material and leaves in a given direction,
   said material having chromium atoms therein; and
   optical pumping means for varying the index of refraction of said material to thereby deflect the light beam from said given direction,
   said optical pumping means including means for changing the energy level of said atoms by causing them to absorb photons,
   and means for exciting more chromium atoms in said material on one side of the beam path than on the other side, thereby varying the index of refraction of said material in a direction transverse to said beam path.

3. An optical energy containing beam deflector comprising:
   a light energy source;
   means for transmitting a light beam from said source along a path;
   a material positioned in said path having a first index of refraction whereby the light beam passes through the material and leaves in a given direction, said material having chromium atoms therein;
   optical pumping means for varying the index of refraction of said material to thereby deflect the light beam from said given direction,
   said pumping means including means for changing the energy level of said atoms by causing them to absorb photons,
   and being arranged to excite more chromium atoms in said material on one side of the beam path than on the other side,
   thereby varying the index of refraction of said material in a direction transverse to said beam path; and
   means variably changing the optical output intensity of said pumping means to thereby change the population density of excited atoms.

References Cited
UNITED STATES PATENTS

| | | | |
|---|---|---|---|
| 1,923,891 | 8/1933 | Skaupy | 88—61 |
| 2,451,732 | 10/1948 | Hershberger | 88—61 |
| 2,915,943 | 12/1959 | Brown et al. | 88—61 |
| 3,130,254 | 4/1964 | Sorokin et al. | 331—94.5 |

JEWELL H. PEDERSEN, *Primary Examiner.*

R. L. WIBERT, *Assistant Examiner.*